United States Patent
Song et al.

(10) Patent No.: US 12,225,082 B2
(45) Date of Patent: Feb. 11, 2025

(54) METHOD AND DEVICE FOR SYNCHRONIZATION FOR RESOURCE OFFLOADING IN M2M SYSTEM

(71) Applicants: Hyundai Motor Company, Seoul (KR); Kia Corporation, Seoul (KR); Industry Academy Cooperation Foundation of Sejong University, Seoul (KR)

(72) Inventors: Jae Seung Song, Seoul (KR); Min Byeong Lee, Gyeonggi-do (KR)

(73) Assignees: Hyundai Motor Company, Seoul (KR); Kia Corporation, Seoul (KR); Industry Academy Cooperation Foundation of Sejong University, Seoul (KR)

( * ) Notice: Subject to any disclaimer, the term of this patent is extended or adjusted under 35 U.S.C. 154(b) by 358 days.

(21) Appl. No.: 17/802,218

(22) PCT Filed: May 3, 2021

(86) PCT No.: PCT/KR2021/005568
§ 371 (c)(1),
(2) Date: Aug. 25, 2022

(87) PCT Pub. No.: WO2021/230551
PCT Pub. Date: Nov. 18, 2021

(65) Prior Publication Data
US 2023/0115969 A1   Apr. 13, 2023

Related U.S. Application Data

(60) Provisional application No. 63/023,962, filed on May 13, 2020.

(51) Int. Cl.
*H04W 4/70* (2018.01)
*H04L 67/1074* (2022.01)

(52) U.S. Cl.
CPC .......... *H04L 67/1074* (2013.01); *H04W 4/70* (2018.02)

(58) Field of Classification Search
CPC ... H04L 67/1074; H04L 41/082; H04L 67/10; H04L 67/1095; H04L 67/59; H04L 67/61; H04W 4/70
See application file for complete search history.

(56) References Cited

U.S. PATENT DOCUMENTS

2016/0302085 A1*  10/2016  Park .................. H04W 24/02
2017/0055233 A1*  2/2017   Takano ............... H04W 4/70
(Continued)

FOREIGN PATENT DOCUMENTS

| KR | 10-2019-0104843 A | 9/2019 |
| KR | 10-2020-0005492 A | 1/2020 |
| WO | 2020/009537 A1    | 1/2020 |

OTHER PUBLICATIONS

International Search Report issued on Aug. 6, 2021 in PCT Application No. PCT/KR2021/005568.
(Continued)

*Primary Examiner* — Kenneth T Lam
(74) *Attorney, Agent, or Firm* — Fox Rothschild LLP

(57) ABSTRACT

Resource synchronization in an machine-to-machine (M2M) system is disclosed. A method of operating an M2M device may comprise creating a first resource, receiving a first message for requesting an update to the first resource, and transmitting a second message for requesting an update to a second resource to another device hosting the second resource synchronized with the first resource. The first resource may comprise at least one attribute for offloading of a resource.

15 Claims, 12 Drawing Sheets

(56) References Cited

U.S. PATENT DOCUMENTS

| | | | |
|---|---|---|---|
| 2017/0099562 A1* | 4/2017 | Bhalla | H04W 4/50 |
| 2018/0183855 A1* | 6/2018 | Sabella | G06F 9/5072 |
| 2019/0320304 A1* | 10/2019 | Wu | H04L 67/10 |
| 2020/0044760 A1* | 2/2020 | Seed | H04W 4/70 |
| 2021/0281657 A1* | 9/2021 | Kim | H04L 63/10 |
| 2022/0007163 A1* | 1/2022 | Na | H04L 67/1095 |
| 2022/0015096 A1* | 1/2022 | Na | H04L 67/60 |

OTHER PUBLICATIONS

ONEM2M, Study on Edge and Fog Computing in ONEM2M System, ONEM2M-TR-005 2-V-0.11.0. Mar. 7, 2020, see pp. 37-38 and 45-46 and figure 7.3.3.2-1.
"How Does One-Way vs Two-Way Data Synchronization Work?" DryvIQ, XP093170111, May 14, 2019, 11 pages.

\* cited by examiner

METHOD AND DEVICE FOR SYNCHRONIZATION FOR RESOURCE OFFLOADING IN M2M SYSTEM

CROSS-REFERENCES TO RELATED APPLICATIONS

This application is a 35 U.S.C. § 371 U.S. national entry of International Application No. PCT/KR2021/005568, filed on May 3, 2021, which claims the priority of U.S. Provisional Application Ser. No. 63/023,962, filed on May 13, 2020, which is herein incorporated by reference in their entity.

TECHNICAL FIELD

The present disclosure relates to a method and device for synchronization between resources in a machine-to-machine (M2M) system. More specifically, the present disclosure relates to a method and device for synchronization for resource offloading in an M2M system.

BACKGROUND ART

Recently, introduction of Machine-to-Machine (M2M) system has become active. An M2M communication may refer to a communication performed between machines without human intervention. M2M may refer to Machine Type Communication (MTC), Internet of Things (IoT) or Device-to-Device (D2D). In the following description, the term "M2M" is uniformly used for convenience of explanation, but the present disclosure is not limited thereto. A terminal used for M2M communication may be an M2M terminal or an M2M device. An M2M terminal may generally be a device having low mobility while transmitting a small amount of data. Herein, the M2M terminal may be used in connection with an M2M server that centrally stores and manages inter-machine communication information. In addition, an M2M terminal may be applied to various systems such as object tracking, automobile linkage, and power metering.

Meanwhile, with respect to an M2M terminal, the oneM2M standardization organization provides requirements for M2M communication, things to things communication and IoT technology, and technologies for architecture, Application Program Interface (API) specifications, security solutions and interoperability. The specifications of the oneM2M standardization organization provide a framework to support a variety of applications and services such as smart cities, smart grids, connected cars, home automation, security and health.

SUMMARY

Technical Problem

The present disclosure is directed to providing a method and device for synchronization between resources in a machine-to-machine (M2M) system.

The present disclosure is directed to providing a method and device for synchronization between an offloaded resource and an original resource in an M2M system.

Technical Solution

According to an embodiment of the present disclosure, the method of operation of the M2M device in the machine-to-machine (M2M) system may include generating a first resource, receiving a first message requesting an update to the first resource, and sending a second message requesting an update of the second resource to another device hosting a second resource synchronized with the first resource. The first resource may include at least one attribute for offloading the resource.

According to one embodiment of the present disclosure, the M2M device in a machine-to-machine (M2M system includes a transceiver for transmitting and receiving a signal, and a processor for controlling the transceiver, wherein the processor generates a first resource, receives a first message requesting an update to the first resource, and may be controlled to send a second message requesting the update of the second resource to another device that hosts a second resource synchronized with the first resource. The first resource may include at least on attribute for offloading the resource.

Effects of Invention

According to the present disclosure, it is possible to effectively synchronize related resources in a machine-to-machine (M2M) system.

It will be appreciated by persons skilled in the art that that the effects that can be achieved through the present disclosure are not limited to what has been particularly described hereinabove and other advantages of the present disclosure will be more clearly understood from the detailed description.

DESCRIPTION

Figure 1:
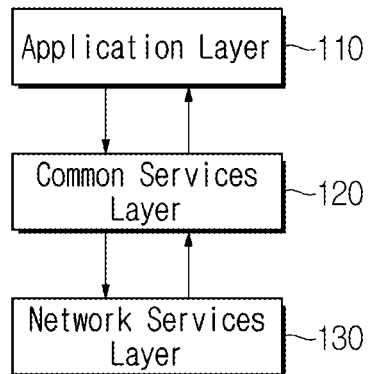
FIG. 1 illustrates a layered structure of a machine-to-machine (M2M) system according to the present disclosure.

Hereinafter, embodiments of the present disclosure will be described in detail with reference to the accompanying drawings, which will be easily implemented by those skilled in the art. However, the present disclosure may be embodied in many different forms and is not limited to the exemplary embodiments described herein.

In the present disclosure, the terms first, second, etc. are used only for the purpose of distinguishing one component from another, and do not limit the order or importance of components, etc. unless specifically stated otherwise. Thus, within the scope of this disclosure, a first component in one embodiment may be referred to as a second component in another embodiment, and similarly a second component in one embodiment may be referred to as a first component.

In the present disclosure, when a component is referred to as being "linked", "coupled", or "connected" to another component, it is understood that not only a direct connection relationship but also an indirect connection relationship through an intermediate component may also be included. Also, when a component is referred to as "comprising" or "having" another component, it may mean further inclusion of another component not the exclusion thereof, unless explicitly described to the contrary.

In the present disclosure, components that are distinguished from each other are intended to clearly illustrate each feature. However, it does not necessarily mean that the components are separate. In other words, a plurality of components may be integrated into one hardware or software unit, or a single component may be distributed into a plurality of hardware or software units. Thus, unless otherwise noted, such integrated or distributed embodiments are also included within the scope of the present disclosure.

In the present disclosure, components described in the various embodiments are not necessarily essential components, and some may be optional components. Accordingly, embodiments consisting of a subset of the components described in one embodiment are also included within the scope of the present disclosure. Also, exemplary embodiments that include other components in addition to the components described in the various exemplary embodiments are also included in the scope of the present disclosure.

In the following description of the embodiments of the present disclosure, a detailed description of known functions and configurations incorporated herein will be omitted when it may make the subject matter of the present disclosure rather unclear. Parts not related to the description of the present disclosure in the drawings are omitted, and like parts are denoted by similar reference numerals.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

In addition, the present specification describes a network based on Machine-to-Machine (M2M) communication, and a work in M2M communication network may be performed in a process of network control and data transmission in a system managing the communication network. In the present specification, an M2M terminal may be a terminal performing M2M communication. However, in consideration of backward compatibility, it may be a terminal operating in a wireless communication system. In other words, an M2M terminal may refer to a terminal operating based on M2M communication network but is not limited thereto. An M2M terminal may operate based on another wireless communication network and is not limited to the exemplary embodiment described above.

In addition, an M2M terminal may be fixed or have mobility. An M2M server refers to a server for M2M communication and may be a fixed station or a mobile station. In the present specification, an entity may refer to hardware like M2M device, M2M gateway and M2M server. In addition, for example, an entity may be used to refer to software configuration in a layered structure of M2M system and is not limited to the embodiment described above.

In addition, for example, the present disclosure mainly describes an M2M system but is not solely applied thereto. In addition, an M2M server may be a server that performs communication with an M2M terminal or another M2M server. In addition, an M2M gateway may be a connection point between an M2M terminal and an M2M server. For example, when an M2M terminal and an M2M server have different networks, the M2M terminal and the M2M server may be connected to each other through an M2M gateway. Herein, for example, both an M2M gateway and an M2M server may be M2M terminals and are not limited to the embodiment described above.

The present disclosure relates to a method and device for handling personal data in a machine-to-machine (M2M) system. More specifically, the present disclosure describes a technique for confirming consent for the handling of personal data in an M2M system.

Further, oneM2M is a de facto standards organization that was founded to develop a communal IoT service platform sharing and integrating application service infrastructure (platform) environments beyond fragmented service platform development structures limited to separate industries like energy, transportation, national defense and public service.oneM2M aims to render requirements for things to things communication and IoT technology, architectures, Application Program Interface (API) specifications, security solutions and interoperability. For example, the specifications of oneM2M provide a framework to support a variety of applications and services such as smart cities, smart grids, connected cars, home automation, security and health. In this regard, oneM2M has developed a set of standards defining a single horizontal platform for data exchange and sharing among all the applications. Applications across different industrial sections may also be considered by oneM2M. Like an operating system, oneM2M provides a framework connecting different technologies, thereby creating distributed software layers facilitating unification. Distributed software layers are implemented in a common services layer between M2M applications and communication Hardware/Software (HW/SW) rendering data transmission. For example, a common services layer may be a part of a layered structure illustrated in FIG. 1.

FIG. 1 is a view illustrating a layered structure of an Machine-to-Machine (M2M) system according to the present disclosure. Referring to FIG. 1, a layered structure of an M2M system may include an application layer 110, a common services layer 120 and a network services layer 130. Herein, the application layer 110 may be a layer operating based on a specific application. For example, an application may be a fleet tracking application, a remote blood sugar monitoring application, a power metering application or a controlling application. In other words, an application layer may a layer for a specific application. Herein, an entity operating based on an application layer may be an application entity (AE).

The common services layer 120 may be a layer for a common service function (CSF). For example, the common services layer 120 may be a layer for providing common services like data management, device management, M2M service subscription management and location service. For example, an entity operating based on the common services layer 120 may be a common service entity (CSE).

The common services layer 120 may provide a set of services that are grouped into CSFs according to functions. A multiplicity of instantiated CSFs constitutes CSEs. CSEs may interface with applications (for example, application entities or AEs in the terminology of oneM2M), other CSEs and base networks (for example, network service entities or NSEs in the terminology of oneM2M). The network services layer 130 may provide the common services layer 120 with services such as device management, location service and device triggering. Herein, an entity operating based on the network layer 120 may be a network service entity (NSE).

Figure 2:
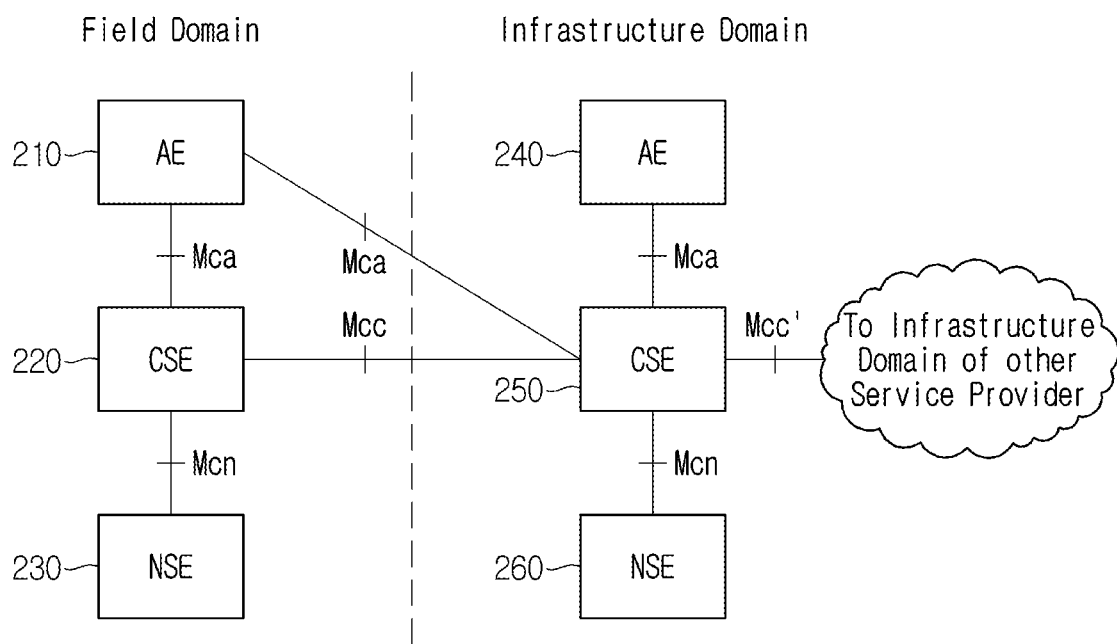
FIG. 2 illustrates a reference point in an M2M system according to the present disclosure.

FIG. 2 is a view illustrating reference points in an M2M system according to the present disclosure. Referring to FIG. 2, an M2M system structure may be distinguished into a field domain and an infrastructure domain. Herein, in each domain, each of the entities may perform communication through a reference point (for example, Mca or Mcc). For example, a reference point may indicate a communication flow between each entity. In particular, referring to FIG. 2, the reference point Mca between AE 210 or 240 and CSE 220 or 250, the reference point Mcc between different CSEs and Mcn reference point between CSE 220 or 250 and NSE 230 or 260 may be set.

Figure 3:
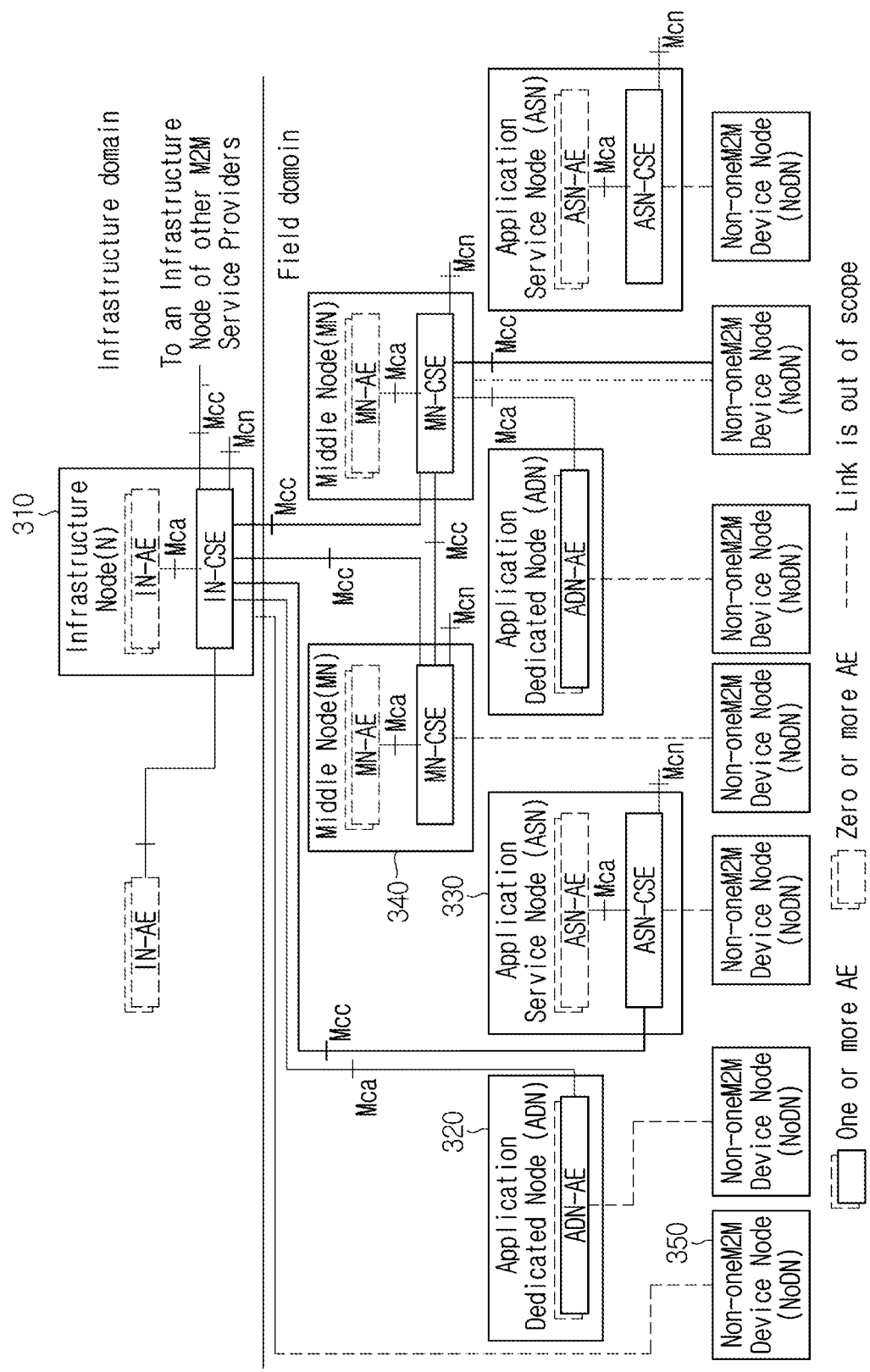
FIG. 3 illustrates each node in an M2M system according to the present disclosure.

FIG. 3 is a view illustrating each node in an M2M system according to the present disclosure. Referring to FIG. 3, an infrastructure domain of a specific M2M service provider may provide a specific infrastructure node (IN) 310. Herein, the CSE of the IN may be configured to perform communication based on the AE and the reference point Mca of another infrastructure node. In particular, one IN may be set for each M2M service provider. In other words, the IN may be a node that performs communication with the M2M terminal of another infrastructure based on an infrastructure structure. In addition, for example, conceptually, a node may be a logical entity or a software configuration.

Next, an application dedicated node (ADN) 320 may be a node including at least one AE but not CSE. In particular, an ADN may be set in the field domain. In other words, an ADN may be a dedicated node for AE. For example, an ADN may be a node that is set in an M2M terminal in hardware. In addition, the application service node (ASN) 330 may be a node including one CSE and at least one AE. ASN may be set in the field domain. In other words, it may be a node including AE and CSE. In particular, an ASN may be a node connected to an IN. For example, an ASN may be a node that is set in an M2M terminal in hardware.

In addition, a middle node (MN) 340 may be a node including a CSE and including zero or more AEs. In particular, the MN may be set in the field domain. An MN may be connected to another MN or IN based on a reference point. In addition, for example, an MN may be set in an M2M gateway in hardware. As an example, a non-M2M terminal node 350 (Non-M2M device node, NoDN) is a node that does not include M2M entities. It may be a node that performs management or collaboration together with an M2M system.

Figure 4:
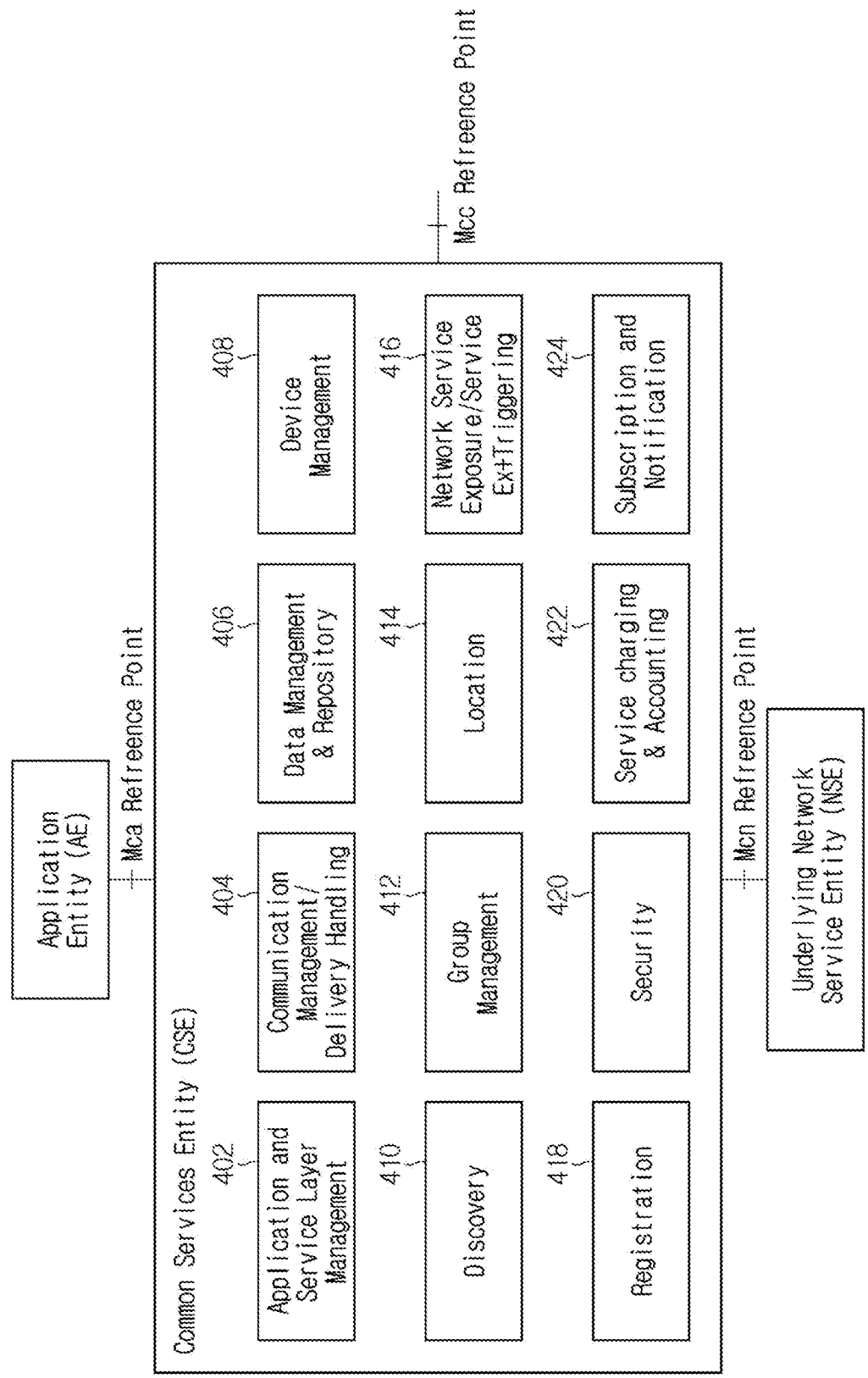
FIG. 4 illustrates a common service function in an M2M system according to the present disclosure.

FIG. 4 is a view illustrating a common service function in an M2M system according to the present disclosure. Referring to FIG. 4, common service functions may be provided. For example, a common service entity may provide at least one or more CSFs among application and service layer management 402, communication management and delivery handling 404, data management and repository 406, device management 408, discovery 410, group management 412, location 414, network service exposure/service execution and triggering 416, registration 418, security 420, service charging and accounting 422, service session management and subscription/notification 424. At this time, M2M terminals may operate based on a common service function. In addition, a common service function may be possible in other embodiments and is not limited to the above-described exemplary embodiment.

The application and service layer management 402 CSF provides management of AEs and CSEs. The application and service layer management 402 CSF includes not only the configuring, problem solving and upgrading of CSE functions but also the capability of upgrading AEs. The communication management and delivery handling 404 CSF provides communications with other CSEs, AEs and NSEs. The communication management and delivery handling 404 CSF are configured to determine at what time and through what connection communications are to be delivered, and also determine to buffer communication requests to deliver the communications later, if necessary and permitted.

The data management and repository 406 CSF provides data storage and transmission functions (for example, data collection for aggregation, data reformatting, and data storage for analysis and sematic processing). The device management 408 CSF provides the management of device capabilities in M2M gateways and M2M devices.

The discovery 410 CSF is configured to provide an information retrieval function for applications and services based on filter criteria. The group management 412 CSF provides processing of group-related requests. The group management 412 CSF enables an M2M system to support bulk operations for many devices and applications. The location 414 CSF is configured to enable AEs to obtain geographical location information.

The network service exposure/service execution and triggering 416 CSF manages communications with base networks for access to network service functions. The registration 418 CSF is configured to provide AEs (or other remote CSEs) to a CSE. The registration 418 CSF allows AEs (or remote CSE) to use services of CSE. The security 420 CSF is configured to provide a service layer with security functions like access control including identification, authentication and permission. The service charging and accounting 422 CSF is configured to provide charging functions for a service layer. The subscription/notification 424 CSF is configured to allow subscription to an event and notifying the occurrence of the event.

Figure 5:
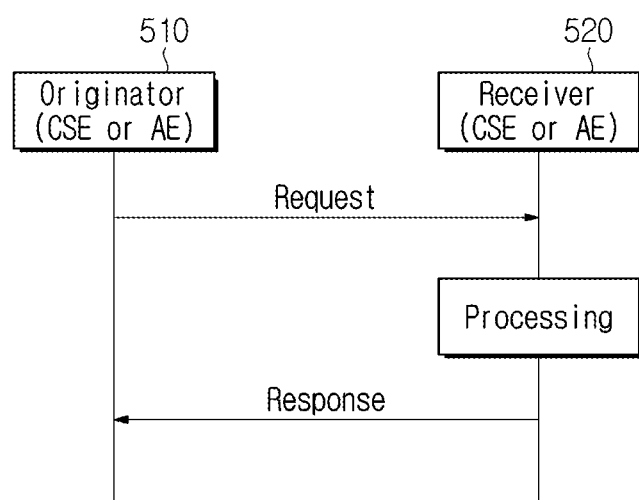
FIG. 5 illustrates a method in which an originator and a receiver exchange a message in an M2M system according to the present disclosure.

FIG. 5 is a view illustrating that an originator and a receiver exchange a message in an M2M system according to the present disclosure. Referring to FIG. 5, the originator 501 may be configured to transmit a request message to the receiver 520. In particular, the originator 510 and the receiver 520 may be the above-described M2M terminals. However, the originator 510 and the receiver 520 are not limited to M2M terminals but may be other terminals. They are not limited to the above-described exemplary embodiment. In addition, for example, the originator 510 and the receiver 520 may be nodes, entities, servers or gateways, which are described above. In other words, the originator 510 and the receiver 520 may be hardware or software configurations and are not limited to the above-described embodiment.

Herein, for example, a request message transmitted by the originator 510 may include at least one parameter. Additionally, a parameter may be a mandatory parameter or an optional parameter. For example, a parameter related to a transmission terminal, a parameter related to a receiving terminal, an identification parameter and an operation parameter may be mandatory parameters. In addition, optional parameters may be related to other types of information. In particular, a transmission terminal-related parameter may be a parameter for the originator 510. In addition, a receiving terminal-related parameter may be a parameter for the receiver 520. An identification parameter may be a parameter required for identification of each other.

Further, an operation parameter may be a parameter for distinguishing operations. For example, an operation parameter may be set to any one among Create, Retrieve, Update, Delete and Notify. In other words, the parameter may aim to distinguish operations. In response to receiving a request message from the originator 510, the receiver 520 may be configured to process the message. For example, the receiver 520 may be configured to perform an operation included in a request message. For the operation, the receiver 520 may be configured to determine whether a parameter is valid and authorized. In particular, in response to determining that a parameter is valid and authorized, the receiver 520 may be configured to check whether there is a requested resource and perform processing accordingly.

For example, in case an event occurs, the originator 510 may be configured to transmit a request message including a parameter for notification to the receiver 520. The receiver 520 may be configured to check a parameter for a notification included in a request message and may perform an operation accordingly. The receiver 520 may be configured to transmit a response message to the originator 510.

A message exchange process using a request message and a response message, as illustrated in FIG. 5, may be performed between AE and CSE based on the reference point Mca or between CSEs based on the reference point Mcc. In other words, the originator 510 may be AE or CSE, and the receiver 520 may be AE or CSE. According to an operation in a request message, such a message exchange process as illustrated in FIG. 5 may be initiated by either AE or CSE.

A request from a requestor to a receiver through the reference points Mca and Mcc may include at least one mandatory parameter and at least one optional parameter. In other words, each defined parameter may be either mandatory or optional according to a requested operation. For example, a response message may include at least one parameter among those listed in Table 1 below.

TABLE 1

Response message parameter/success or not

Response Status Code - successful, unsuccessful, ack
Request Identifier - uniquely identifies a Request message
Content - to be transferred
To - the identifier of the Originator or the Transit CSE that sent the corresponding non-blocking request
From - the identifier of the Receiver
Originating Timestamp - when the message was built
Result Expiration Timestamp - when the message expires
Event Category - what event category shall be used for the response message
Content Status
Content Offset
Token Request Information
Assigned Token Identifiers
Authorization Signature Request Information
Release Version Indicator - the oneM2M release version that this response message conforms to A filter criteria condition, which can be used in a request message or a response message, may be defined as in Table 2 and Table 3 below.

TABLE 2

| Condition tag | Multiplicity | Description Matching Conditions |
|---|---|---|
| createdBefore | 0 . . . 1 | The creationTime attribute of the matched resource is chronologically before the specified value. |
| createdAfter | 0 . . . 1 | The creationTime attribute of the matched resource is chronologically after the specified value. |
| modifiedSince | 0 . . . 1 | The lastModifiedTime attribute of the matched resource is chronologically after the specified value. |
| unmodifiedSince | 0 . . . 1 | The lastModifiedTime attribute of the matched resource is chronologically before the specified value. |
| stateTagSmaller | 0 . . . 1 | The stateTag attribute of the matched resource is smaller than the specified value. |
| stateTagBigger | 0 . . . 1 | The stateTag attribute of the matched resource is bigger than the specified value. |
| expireBefore | 0 . . . 1 | The expirationTime attribute of the matched resource is chronologically before the specified value. |
| expireAfter | 0 . . . 1 | The expirationTime attribute of the matched resource is chronologically after the specified value. |
| labels | 0 . . . 1 | The labels attribute of the matched resource matches the specified value. |
| labelsQuery | 0 . . . 1 | The value is an expression for the filtering of labels attribute of resource when it is of key-value pair format. The expression is about the relationship between label-key and label-value which may include equal to or not equal to, within or not within a specified set etc. For example, label-key equals to label value, or |

TABLE 2-continued

| Condition tag | Multiplicity | Description |
|---|---|---|
| | | Matching Conditions |
| | | label-key within {label-value1, label-value2}. Details are defined in [3] |
| childLabels | 0 . . . 1 | A child of the matched resource has labels attributes matching the specified value. The evaluation is the same as for the labels attribute above. Details are defined in [3]. |
| parentLabels | 0 . . . 1 | The parent of the matched resource has labels attributes matching the specified value. The evaluation is the same as for the labels attribute above. Details are defined in [3]. |
| resourceType | 0 . . . n | The resourceType attribute of the matched resource is the same as the specified value. It also allows differentiating between normal and announced resources. |
| childResourceType | 0 . . . n | A child of the matched resource has the resourceType attribute the same as the specified value. |
| parentResourceType | 0 . . . 1 | The parent of the matched resource has the resourceType attribute the same as the specified value. |
| sizeAbove | 0 . . . 1 | The contentsize attribute of the <contentInstance> matched resource is equal to or greater than the specified value. |
| sizeBelow | 0 . . . 1 | The contentSize attribute of the <contentInstance> matched resource is smaller than the specified value. |
| contentType | 0 . . . n | The contentInfo attribute of the <contentInstance> matched resource matches the specified value. |
| attribute | 0 . . . n | This is an attribute of resource types (clause 9.6). Therefore, a real tag name is variable and depends on its usage and the value of the attribute can have wild card *. E.g. creator of container resource type can be used as a filter criteria tag as "creator=Sam", "creator=Sam*", "creator=*Sam". |
| childAttribute | 0 . . . n | A child of the matched resource meets the condition provided. The evaluation of this condition is similar to the attribute matching condition above. |
| parentAttribute | 0 . . . n | The parent of the matched resource meets the condition provided. The evaluation of this condition is similar to the attribute matching condition above. |
| semanticsFilter | 0 . . . n | Both semantic resource discovery and semantic query use semanticsFilter to specify a query statement that shall be specified in the SPARQL query language [5]. When a CSE receives a RETRIEVE request including a semanticsFilter, and the Semantic Query Indicator parameter is also present in the request, the request shall be processed as a semantic query; otherwise, the request shall be processed as a semantic resource discovery. In the case of semantic resource discovery targeting a specific resource, if the semantic description contained in the <semanticDescriptor> of a child resource matches the semanticFilter, the URI of this child resource will be included in the semantic resource discovery result. In the case of semantic query, given a received semantic query request and its query scope, the SPARQL query statement shall be executed over aggregated semantic information collected from the semantic resource(s) in the query scope and the produced output will be the result of this semantic query. Examples for matching semantic filters in SPARQL to semantic descriptions can be found in [i.28]. |
| filterOperation | 0 . . . 1 | Indicates the logical operation (AND/OR) to be used for different condition tags. The default value is logical AND. |
| contentFilterSyntax | 0 . . . 1 | Indicates the Identifier for syntax to be applied for content-based discovery. |
| contentFilterQuery | 0 . . . 1 | The query string shall be specified when contentFilterSyntax parameter is present. |

TABLE 3

| Condition tag | Multiplicity | Description |
|---|---|---|
| | | Filter Handling Conditions |
| filterUsage | 0..1 | Indicates how the filter criteria is used. If provided, possible values are 'discovery' and 'IPEOnDemandDiscovery'. If this parameter is not provided, the Retrieve operation is a generic retrieve operation and the content of the child resources fitting the filter criteria is returned. If filterUsage is 'discovery', the Retrieve operation is for resource discovery (clause 10.2.6), i.e. only the addresses of the child resources are returned. If filterUsage is 'IPEOnDemandDiscovery', the other filter conditions are sent to the IPE as well as the discovery Originator |

TABLE 3-continued

| Condition tag | Multiplicity | Description |
|---|---|---|
| | | ID. When the IPE successfully generates new resources matching with the conditions, then the resource address(es) shall be returned. This value shall only be valid for the Retrieve request targeting an <AE> resource that represents the IPE. |
| limit | 0..1 | The maximum number of resources to be included in the filtering result. This may be modified by the Hosting CSE. When it is modified, then the new value shall be smaller than the suggested value by the Originator. |
| level | 0..1 | The maximum level of resource tree that the Hosting CSE shall perform the operation starting from the target resource (i.e. To parameter). This shall only be applied for Retrieve operation. The level of the target resource itself is zero and the level of the direct children of the target is one. |
| offset | 0..1 | The number of direct child and descendant resources that a Hosting CSE shall skip over and not include within a Retrieve response when processing a Retrieve request to a targeted resource. |
| applyRelativePath | 0..1 | This attribute contains a resource tree relative path (e.g. ../tempContainer/LATEST). This condition applies after all the matching conditions have been used (i.e. a matching result has been obtained). The attribute determines the set of resource(s) in the final filtering result. The filtering result is computed by appending the relative path to the path(s) in the matching result. All resources whose Resource-IDs match that combined path(s) shall be returned in the filtering result. If the relative path does not represent a valid resource, the outcome is the same as if no match was found, i.e. there is no corresponding entry in the filtering result. |

A response to a request for accessing a resource through the reference points Mca and Mcc may include at least one mandatory parameter and at least one optional parameter. In other words, each defined parameter may be either mandatory or optional according to a requested operation or a mandatory response code. For example, a request message may include at least one parameter among those listed in Table 4 below.

TABLE 4

| | Request message parameter |
|---|---|
| Mandatory | Operation - operation to be executed/CREAT, Retrieve, Update, Delete, Notify |
| | To - the address of the target resource on the target CSE |
| | From - the identifier of the message Originator |
| | Request Identifier - uniquely identifies a Request message |
| Operation dependent | Content - to be transferred |
| | Resource Type - of resource to be created |
| Optional | Originating Timestamp - when the message was built |
| | Request Expiration Timestamp - when the request message expires |
| | Result Expiration Timestamp - when the result message expires |
| | Operational Execution Time - the time when the specified operation is to be executed by the target CSE |
| | Response Type - type of response that shall be sent to the Originator |
| | Result Persistence - the duration for which the reference containing the responses is to persist |
| | Result Content - the expected components of the result |
| | Event Category - indicates how and when the system should deliver the message |
| | Delivery Aggregation - aggregation of requests to the same target CSE is to be used |
| | Group Request Identifier - Identifier added to the group request that is to be fanned out to each member of the group |
| | Group Request Target Members-indicates subset of members of a group |
| | Filter Criteria - conditions for filtered retrieve operation |
| | Desired Identifier Result Type - format of resource identifiers returned |
| | Token Request Indicator - indicating that the Originator may attempt Token Request procedure (for Dynamic Authorization) if initiated by the Receiver |
| | Tokens - for use in dynamic authorization |
| | Token IDs - for use in dynamic authorization |
| | Role IDs - for use in role based access control |
| | Local Token IDs - for use in dynamic authorization |
| | Authorization Signature Indicator - for use in Authorization Relationship Mapping |
| | Authorization Signature - for use in Authorization Relationship Mapping |
| | Authorization Relationship Indicator - for use in Authorization Relationship Mapping |
| | Semantic Query Indicator - for use in semantic queries |
| | Release Version Indicator - the oneM2M release version that this request message conforms to. |
| | Vendor Information |

A normal resource includes a complete set of representations of data constituting the base of information to be managed. Unless qualified as either "virtual" or "announced", the resource types in the present document are normal resources. A virtual resource is used to trigger processing and/or a retrieve result. However, a virtual resource does not have a permanent representation in a CSE. An announced resource contains a set of attributes of an original resource. When an original resource changes, an announced resource is automatically updated by the hosting CSE of the original resource. The announced resource contains a link to the original resource. Resource announcement enables resource discovery. An announced resource at a remote CSE may be used to create a child resource at a remote CSE, which is not present as a child of an original resource or is not an announced child thereof.

To support resource announcement, an additional column in a resource template may specify attributes to be announced for inclusion in an associated announced resource type. For each announced <resourceType>, the addition of suffix "Annc" to the original <resourceType> may be used to indicate its associated announced resource type. For example, resource <containerAnnc> may indicate the announced resource type for <container> resource, and <groupAnnc> may indicate the announced resource type for <group> resource.

There may be a case where an IoT server needs to delegate its task or resources to an edge/fog node. For example, when an end IoT device needs real-time support from its server, or when an edge/fog node and a central IoT server shall be synchronized, it may be necessary to delegate tasks or resources to the edge/fog node. Such an operation is likely to be applied in a vehicle to everything (V2X) environment, an industrial IoT environment, and a smart factory environment.

Resource announcement may facilitate resource offloading to be used for edge/fog computing. An original resource of an offloaded resource in an edge/fog node using the announcement may be updated automatically whenever the offloaded resource changes in the offloaded edge/fog node. The original resource is indicated as an offloading resource, and the offloaded resource contains a link to the original resource.

Figure 6A:
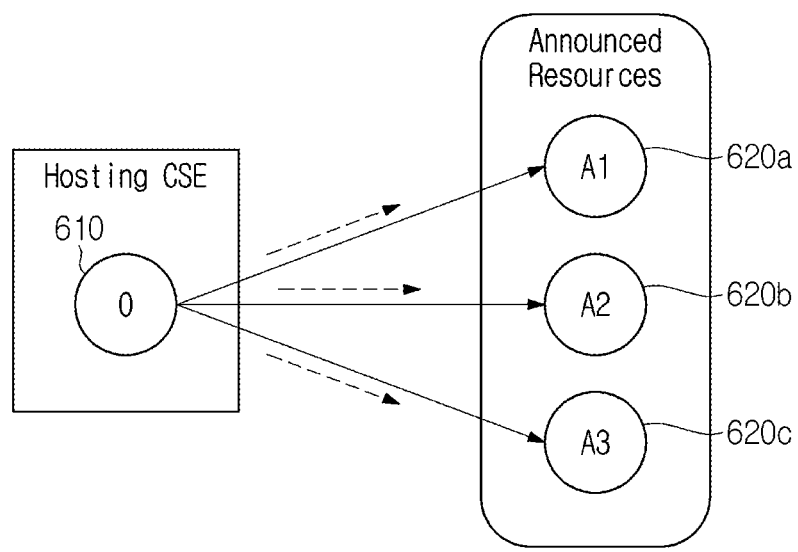
FIGS. 6A and 6B show examples of two types of synchronization performed between an original resource and an announced resource in an M2M system according to the present disclosure.
Figure 6B:
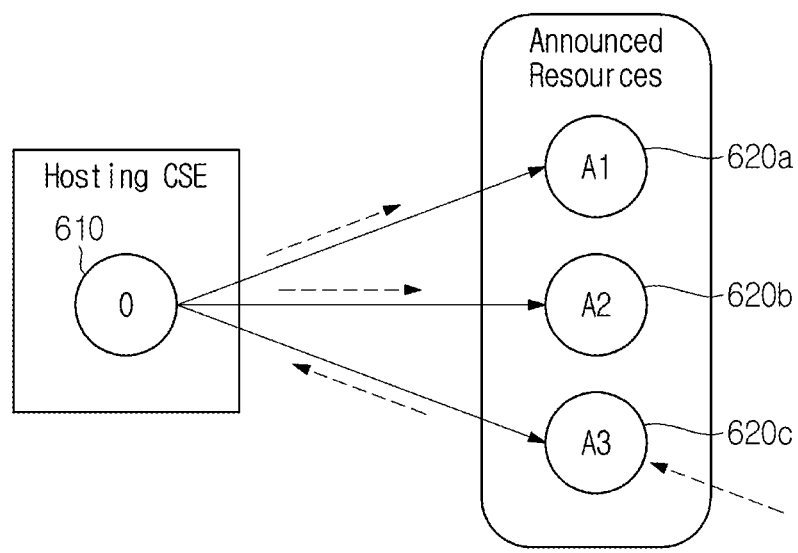

In other words, resource announcement may facilitate resource offloading to be used for edge/fog computing. When an announced resource (e.g., resource deployed on the edge/fog node) is updated by an entity other than the hosting CES of the original resource (e.g., another AE/CSE with privileges to update the announced resource), the hosting CSE of the announced resource transmits an update request to the hosting CES of the original resource to update the original resource. If possible, the hosting CSE of the original resource also reflects the requested update to other announced resources. FIGS. 6A and 6B below show two types of resource synchronization.

FIGS. 6a and 6b show examples of two types of synchronization performed between an original resource and an announced resource in an M2M system according to the present disclosure. As shown in FIG. 6A, when there is at least one announced resource 620a, 620b, or 620c, the update to the original resource 610 may be reflected to all the announced resources 620a, 620b and 620c. In addition, as shown in FIG. 6B, when the resource 620c announced by an entity other than the hosting CES of the original resource is updated, the update to the announced resource 620c may be reflected to the original resource 610, and, if possible, may also be reflected to the other announced resources 610a and 610b.

Updates for announcement and offloading may be different. Only one offloaded resource may be created for one original resource. If there is an offloaded resource, during resource offloading, any modifications to the original resource (e.g., create, update, delete) shall be reflected to all the announced resources and offloaded resource.

As described above, when the resource is offloaded, data mismatch between the original resource and the offloaded resource may occur. Accordingly, the present disclosure proposes various embodiments for resource synchronization.

According to an embodiment, at least one attribute for synchronization may be defined. For example, the at least one attribute may include at least one of an attribute for an offloaded location or an attribute for a type related to announcement. Specifically, the at least one attribute may include at least one of the following <offloadTo>, <announceType> or <announceSyncType>.

When a CREATE or UPDATE request includes an address or CSE-ID to which the resource is offloaded, the <offloadTo> attribute may be included in the CREATE or UPDATE request. When the CSE-ID is provided, an offloaded-to CSE (CSE) may determine the location of the offloaded resource. For the original resource, if the original resource is successfully announced to the offloaded-to CSE, the <offloadTo> attribute may be present in the original resource. The <offloadTo> attribute maintains the resource address of the successfully offloaded resource. Updates on the <offloadTo> attribute will trigger new resource offloading or the termination of offloading.

The <announceType> attribute indicates the type of resource announcement. Possible values are "Announcement" or "offload". The value "announcement" indicates an original announcement type. The value "offload" indicates an announcement type for resource offloading. When the value of the <announceType> attribute is "offload", the location of the offloaded resource is included.

The <announceSyncType> attribute indicates the type of synchronization for resource announcement. Possible values are "uni-directional synchronization" and "bi-directional synchronization". The value "uni-directional synchronization" indicates that at least one announced resource is updated when the original resource is updated. The value "bi-directional synchronization" indicates that at least one announced resource is updated when the original resource is updated and at least the original resource is updated when the announced resource is updated. The <announceSyncType> attribute may be present in both the original resource and the announced resource. Absence of the <announceSyncType> attribute implies that uni-directional synchronization is a synchronization type supported for the announced resource.

Figure 7:
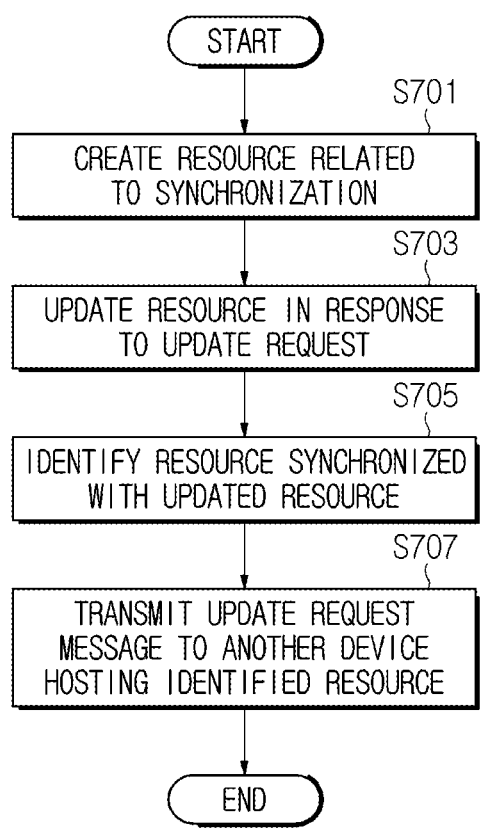
FIG. 7 shows an example of an operation procedure of a device for performing resource synchronization in an M2M system according to the present disclosure.

FIG. 7 shows an example of an operation procedure of a device requesting resource synchronization in an M2M system according to the present disclosure. FIG. 7 illustrates an operation method of a device capable of generating and updating resources (e.g., a device including CES). In the description with reference to FIG. 7, an operating entity is referred to as a "device".

Referring to FIG. 7, in step S701, the device creates a resource related to synchronization. Here, the resource related to synchronization means an original resource of an offloaded resource, an offloaded resource and an announced resource. When the resource related to synchronization is an original resource, since offloading is performed after creating the original resource, although not shown in FIG. 7, after step S701, the device may perform operation for offloading the original resource to another device. When the resource related to synchronization is an offloaded resource, although not shown in FIG. 7, before step S701, the device may receive information on the original resource from another device. Here, the created resource may include at least one of attributes (e. <offloadTo>, <announceType>, <announceSyncType>) related to offloading.

In step S703, the device updates the resource in response to an update request. In other words, the device updates at least one value of the attributes included in the created resource. In this case, the device may update the resource in response to an update request from another device. Here, another device may be a device including an AE that executes an application related to a resource or a device including a CES hosting an original resource or an offloaded resource related to the resource. That is, the update request may be an update request of a general resource by the AE or an update request for synchronization.

In step S705, the device identifies the resource synchronized with the updated resource. For example, if the resource created in step S701 is an original resource, the device identifies whether there is an offloaded resource or announced resource. As another example, when the resource created in step S701 is an offloaded resource, the device identifies the original resource. Here, a resource treated as a synchronized resource may be defined differently according to a specific embodiment. In this case, other resources synchronized according to the update of the resource created in step S701 may be predefined or set by an attribute. In this case, the device may identifies another resource synchronized based on at least one of the attributes included in the resource.

In step S707, the device transmits an update request message to another device hosting the identified resource. In this case, the update request message may include at least one of information indicating that an update for synchronization is requested according to the update of the resource or information on a device (e.g., AE 910) for requesting the update of the offloaded resource. Accordingly, another device may update the resource hosted according to the synchronization procedure.

In the embodiment described with reference to FIG. 7, the device identifies another resource synchronized, and requests the update of the other resource from another device hosting the identified resource. In this case, there may be no other resource synchronized. For example, if the synchronization procedure is defined such that synchronization is performed in a chain and the resource updated in step S703 is a resource corresponding to the end of the chain, there may be no additionally synchronized resource. If there is no other resource synchronized, step S707 of FIG. 7 may be omitted.

According to an embodiment, the update priority between resources related to each other may be defined by announcement or offloading. In other words, the update order of resources having a synchronized relationship may be defined. In this case, even if the update to any one resource is requested, unless a resource having a higher priority is first updated, the resource cannot be updated. To this end, the device may determine whether the update request is an update request by synchronization or a general update request by an application, and perform operation for first updating the resource having a higher priority in the case of a general update request. For example, a priority rule in which an offloaded resource shall be updated before an original resource may be defined, or conversely, a priority rule in which an original resource is updated before an offloaded resource may be defined. An embodiment in which there is a priority for update will be described below with reference to FIG. 8.

Figure 8:
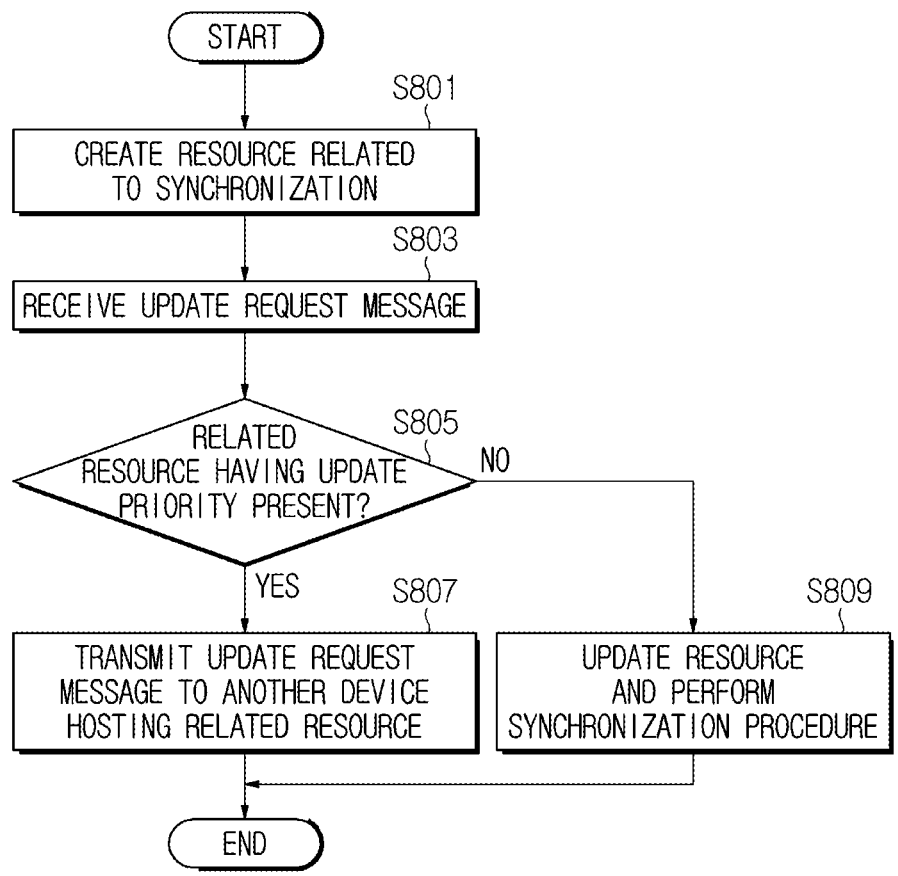
FIG. 8 shows another example of an operation procedure of a device for performing resource synchronization in an M2M system according to the present disclosure.

FIG. 8 shows another example of an operation procedure of a device for performing resource synchronization in an M2M system according to the present disclosure. FIG. 8 shows an operation method of a device (e.g., a device including a CES) capable of creating and updating a resource. In the description with reference to FIG. 8, an operating entity is referred to as a "device".

Referring to FIG. 8, in step S801, the device creates a resource related to synchronization. Here, the resource related to synchronization means an original resource of an offloaded resource, an offloaded resource, and an announced resource. If the resource related to synchronization is an original resource, since offloading is performed after the creation of the original resource, although not shown in FIG. 8, after step S801, the device may perform an operation for offloading the original resource to another device. When the resource related to synchronization is an offloaded resource, although not shown in FIG. 8, before step S801, the device may receive information on the original resource from another device hosting the original resource. Here, the created resource may include at least one of the attributes (e.g., <offloadTo>, <announceType>, <announceSyncType>) related to offloading.

In step S803, the device receives an update request message. In other words, an update request for the resource created in step S801 occurs. The update request message includes a new value of at least one of the attributes included in the resource. Here, the update request message is a message requesting a general update from the AE, not the update for synchronization.

In step S805, the device determines whether there is a related resource having an update priority. The update priority is predefined, and, accordingly, the device may determine whether there is a related resource having a higher update priority based on the resource created thereby. For example, an offloaded resource may have a higher priority than the original resource.

If there is a related resource having an update priority, in step S807, the device transmits an update request message to another device hosting the related resource. That is, the device transmits the update request message to another device. Accordingly, after the related resource hosted in the other device is updated first, the resource stored in the device may be updated by a synchronization procedure.

On the other hand, if there is no related resource having the update priority, in step S809, the device updates the resource and performs the synchronization procedure. That is, since there is no related resource having a higher priority, the device may update the resource according to the update request message received in step S803 without waiting for the update of other related resources. In addition, after updating the resource, the device performs an operation for updating another resource in a synchronized relationship (e.g., transmitting an update request).

According to an embodiment, the update to the original resource may be forwarded to the offloaded resource. Only the offloaded resource is the place to update any modification. After successful update on the offloaded resource, the original resource updates itself and performs the updates to all announced resources. In order to avoid the piggy-back procedure, the hosting CSE of the original resource only updates the announced resources, not the offloaded resource. The resource synchronization procedure according to the above-described embodiment is as shown in FIG. 9 or FIG. 10 below.

Figure 9:
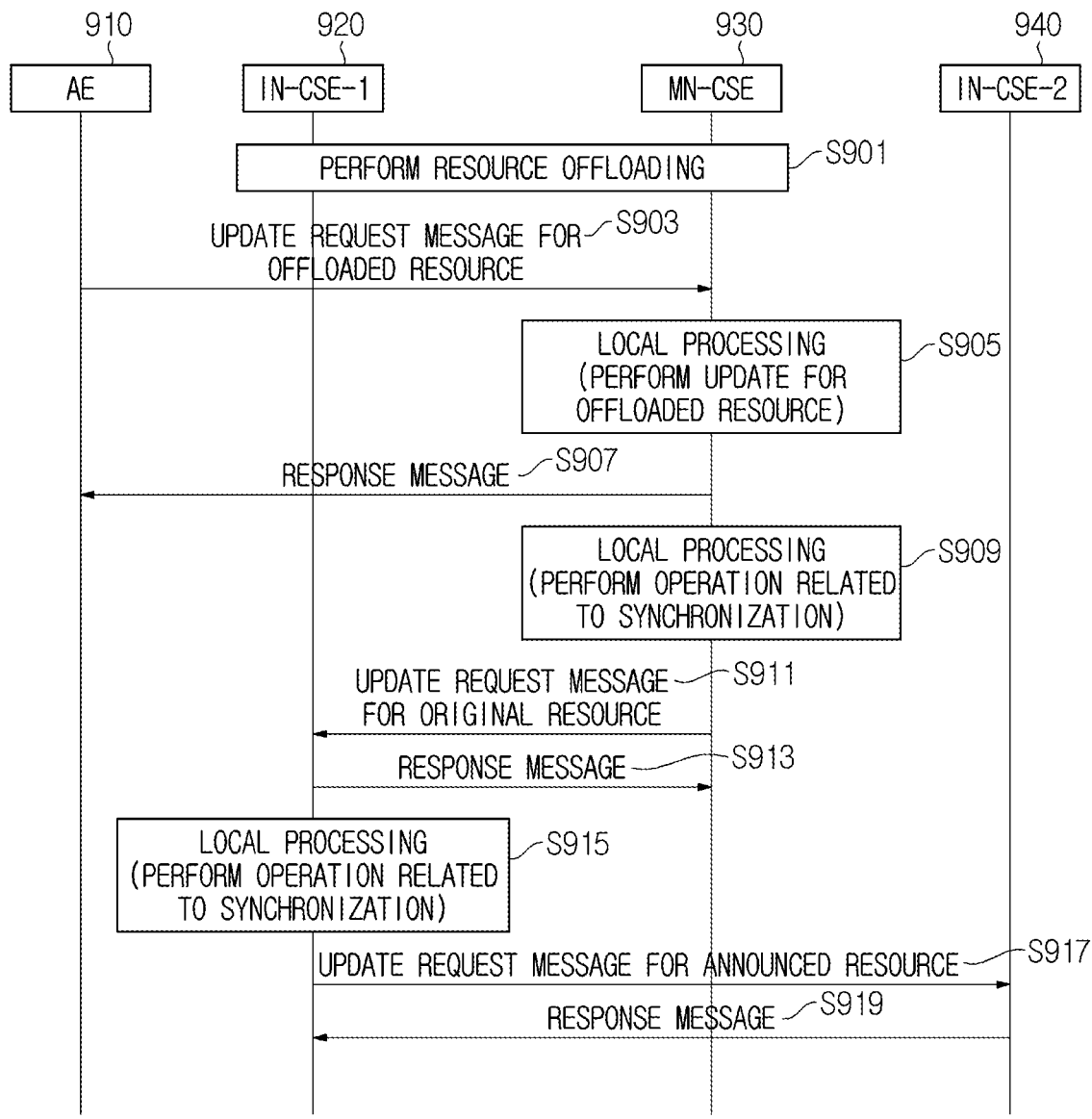
FIG. 9 shows an example of signal exchange for resource synchronization according to an update of an offloaded resource in an M2M system according to the present disclosure.
Figure 10:
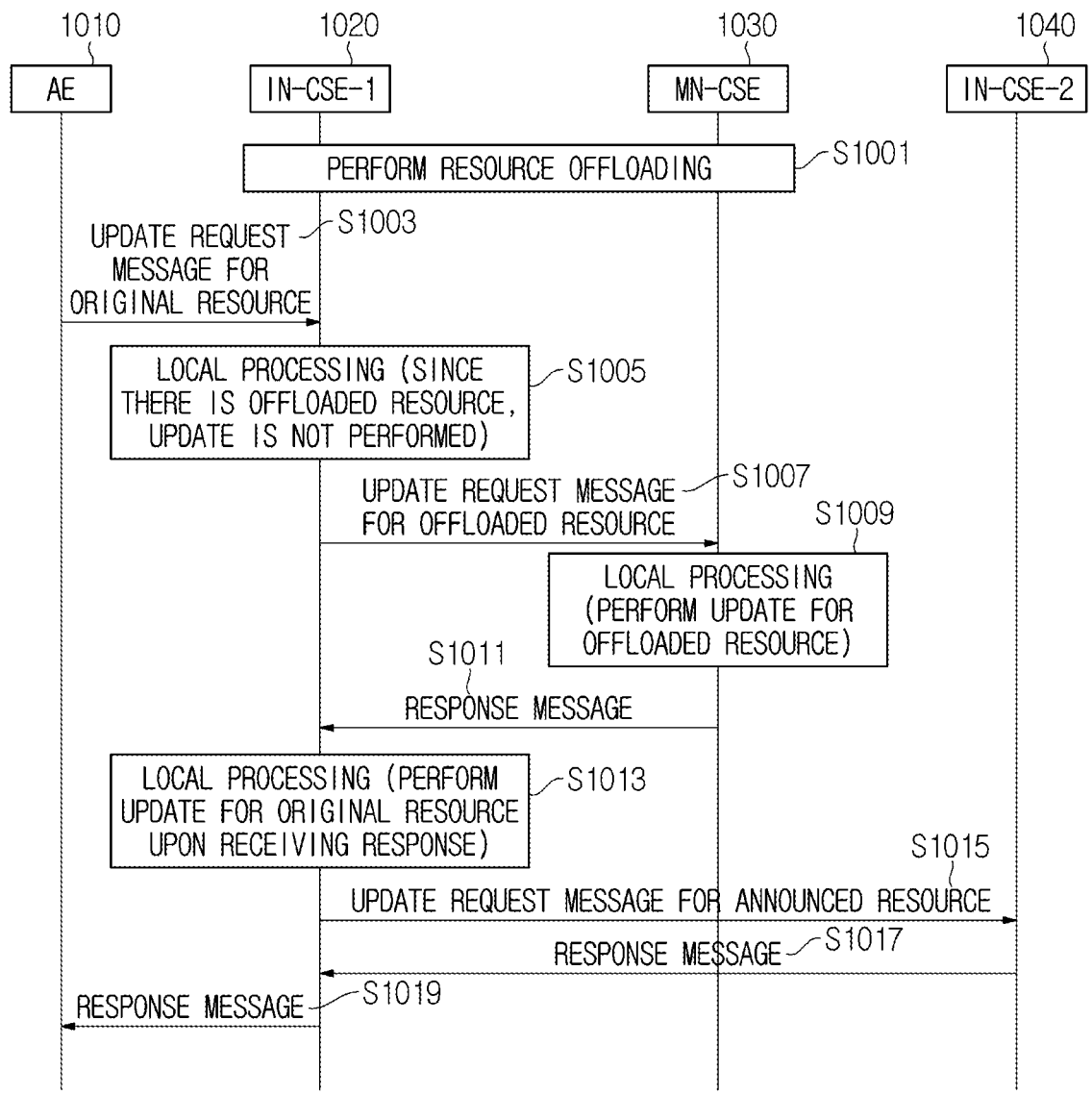
FIG. 10 shows an example of signal exchange for resource synchronization according to an update of an original resource in an M2M system according to the present disclosure.

FIG. 9 shows an example of signal exchange for resource synchronization according to an update of an offloaded resource in an M2M system according to the present disclosure. FIG. 9 shows signal exchange among an AE 910, an IN-CSE-1 920 hosting an original resource, an MN-CSE 930 hosting an offloaded resource, and an IN-CSE-2 940 hosting an announced resource.

Referring to FIG. 9, in step S901, the IN-CSE-1 920 performs an operation for offloading a resource to the MN-CSE 930. Specifically, the IN-CSE-1 920 offloads the original resource created in the IN-CSE-1 920 to the MN-CSE 930. In the example of FIG. 9, the resource is successfully offloaded. Accordingly, the MN-CSE 930 becomes a remote CSE having a resource having the same data as the original resource.

In step S903, the AE 910 transmits an update request message for the offloaded resource to the MN-CSE 930. In other words, the AE 910 requests an update to at least one attribute of the offloaded resource stored in the MN-CSE 930.

In step S905, the MN-CSE 930 performs local processing for updating the offloaded resource. In this case, the MN-CSE 930 may check whether there is an authentication for an update, and may update the offloaded resource if there is an authentication.

In step S907, the MN-CSE 930 transmits a response message to the AE 910. That is, the MN-CSE 930 responds to the AE 910 that the update to the requested resource has been completed.

In step S909, the MN-CSE 930 performs local processing related to synchronization. As the update to the offloaded resource occurs, the MN-CSE 930 which is the remote CSE determines that synchronization on the updated information is performed. In this case, the MN-CSE 930 may determine and perform synchronization based on the values of synchronization-related attributes stored in the resource.

In step S911, the MN-CSE 930 transmits an update request message for the original resource to the IN-CSE-1 920. In other words, the MN-CSE 930 requests an update to at least one attribute of the original resource stored in the IN-CSE-1 920. Here, the at least one attribute includes at least one attribute updated according to the request of the AE 910. According to an embodiment, the update request message may include at least one of information indicating that an update for synchronization is requested according to the update of the offloaded resource or information on the device (e.g., the AE 910) that has requested the update of the offloaded resource.

In step S913, the IN-CSE-1 920 transmits a response message to the MN-CSE 930. That is, the IN-CSE-1 920 updates the value of at least one attribute of the original resource, and responds to the AE 910 that the requested update has been completed.

In step S905, the MN-CSE 930 performs local processing related to synchronization. As the update of the original resource occurs, the IN-CSE-1 920 determines that synchronization on the updated information is performed. Specifically, the IN-CSE-1 920 determines whether there is an announced resource with respect to the original resource, and determines that a procedure for synchronization with the announced resource is performed if there is an announced resource. In this case, the IN-CSE-1 920 may determine and perform synchronization based on the values of synchronization-related attributes stored in the resource. In this embodiment, the update of the original resource causes synchronization on the announced resource.

In step S917, the IN-CSE-1 920 transmits an update request message for the announced resource to the IN-CSE-2 940. In other words, the IN-CSE-1 920 requests an update to at least one attribute of the announced resource stored in the IN-CSE-2 940. Here, the at least one attribute includes at least one attribute updated according to the request of the MN-CSE 930. According to an embodiment, the update request message may include information indicating that an update for synchronization is requested according to the update of the original resource, information on a device (e.g., AE 910) requesting the update of the offloaded resource, and a device (e.g., the MN-CSE 930) that has requested synchronization.

In step S919, the IN-CSE-2 940 transmits a response message to the IN-CSE-1 920. That is, the IN-CSE-2 940 updates the value of at least one attribute of the announced resource, and responds to the IN-CSE-1 920 that the requested update has been completed.

FIG. 10 shows an example of signal exchange for resource synchronization according to an update of an original resource in an M2M system according to the present disclosure. FIG. 10 shows signal exchange among an AE 1010, an IN-CSE-1 1020 hosting an original resource, an MN-CSE 1030 hosting an offloaded resource, and an IN-CSE-2 1040 hosting an announced resource.

Referring to FIG. 10, in step S1001, the IN-CSE-1 1020 performs an operation for offloading a resource to the MN-CSE 1030. Specifically, the IN-CSE-1 1020 offloads the original resource created in the IN-CSE-1 1020 to the MN-CSE 1030. In the example of FIG. 9, the resource is successfully offloaded. Accordingly, the MN-CSE 1030 becomes a remote CSE having a resource having the same data as the original resource.

In step S1003, the AE 1010 transmits an update request message for the original resource to the IN-CSE-1 1020. In other words, the AE 1010 requests an update to at least one attribute of the original resource stored in the IN-CSE-1 1020.

In step S1005, the IN-CSE-1 1020 performs local processing related to the update of the original resource. At this time, the IN-CSE-1 1020 checks whether there is an authentication for an update. If there is an authentication, the IN-CSE-1 1020 determines whether there is an offloaded resource. Since there is an offloaded resource, the IN-CSE-1 1020 does not perform the update to the original resource, and determines that the update request is forwarded to the MN-CSE 1030 hosting the offloaded resource.

In step S1007, the IN-CSE-1 1020 transmits an update request message for the offloaded resource to the MN-CSE 1030. That is, the IN-CSE-1 1020 transmits the update request of the AE 1010 to the MN-CSE 1030. In this case, the update request message may include at least one of information indicating that the update request is transmitted or information on a device (e.g., AE 1010) that has requested the update of the resource.

In step S1009, the MN-CSE 1030 performs local processing related to synchronization. That is, the MN-CSE 1030 updates the value of at least one attribute of the offloaded resource based on the update request.

In step S1011, the MN-CSE 1030 transmits a response message to the IN-CSE-1 1020. That is, the MN-CSE 1030 updates the value of at least one attribute of the offloaded resource, and responds to the IN-CSE-1 1020 that the requested update has been completed.

In step S1013, the IN-CSE-1 1020 performs local processing for an update to the original resource. That is, upon receiving a response message indicating that the update to the offloaded resource has been completed, the IN-CSE-1 1020 updates at least one attribute of the original resource. In other words, upon the successful update in the MN-CSE 1030 hosting the offloaded resource, the original resource is updated. In addition, the IN-CSE-1 1020 determines that synchronization on the updated information is performed. Specifically, the IN-CSE-1 1020 determines whether there is an announced resource with respect to the original resource, and determines that a procedure for synchronization with the announced resource is performed if there is an announced resource. In this case, the IN-CSE-1 1020 may determine and perform synchronization based on the values of synchronization-related attributes stored in the resource. In the case of this embodiment, the update of the original resource causes synchronization on the announced resource.

In step S1015, the IN-CSE-1 1020 transmits an update request message for the announced resource to the IN-CSE-2 1040. In other words, the IN-CSE-1 1020 requests an update to at least one attribute of the announced resource stored in the IN-CSE-2 1040. Here, the at least one attribute includes at least one attribute updated according to the request of the MN-CSE 1030. According to an embodiment, the update request message includes at least one of information indicating that an update for synchronization is requested according to the update of the original resource, information on a device (e.g., AE 1010) that has requested the update of the offloaded resource, and information on the device (e.g., the MN-CSE 1030) that has requested synchronization.

In step S1017, the IN-CSE-2 1040 transmits a response message to the IN-CSE-1 1020. That is, the IN-CSE-2 1040 updates the value of at least one attribute of the announced resource, and responds to the IN-CSE-1 1020 that the requested update has been completed.

In step S1019, the IN-CSE-1 1020 transmits a response message to the AE 1010. That is, the IN-CSE-1 1020 responds to the AE 1010 that the update of the requested resource has been completed.

According to an embodiment, the update may occur in both the original resource and the offloaded resource. When an update occurs on the original resource, the update is propagated to the offloaded resource and to the announced resource. When an update occurs on the offloaded resource, the hosting CSE of the offloaded resource tries to update the original resource. In addition, the hosting CSE of the original resource updates all announced resources. To avoid the piggy-back procedure, when an update request is received from the hosting CES of the offloaded resource, the hosting CSE of the original resource only updates the announced resources. The resource synchronization procedure according to the above-described embodiment is as shown in FIG. 11 or FIG. 12 below.

Figure 11:
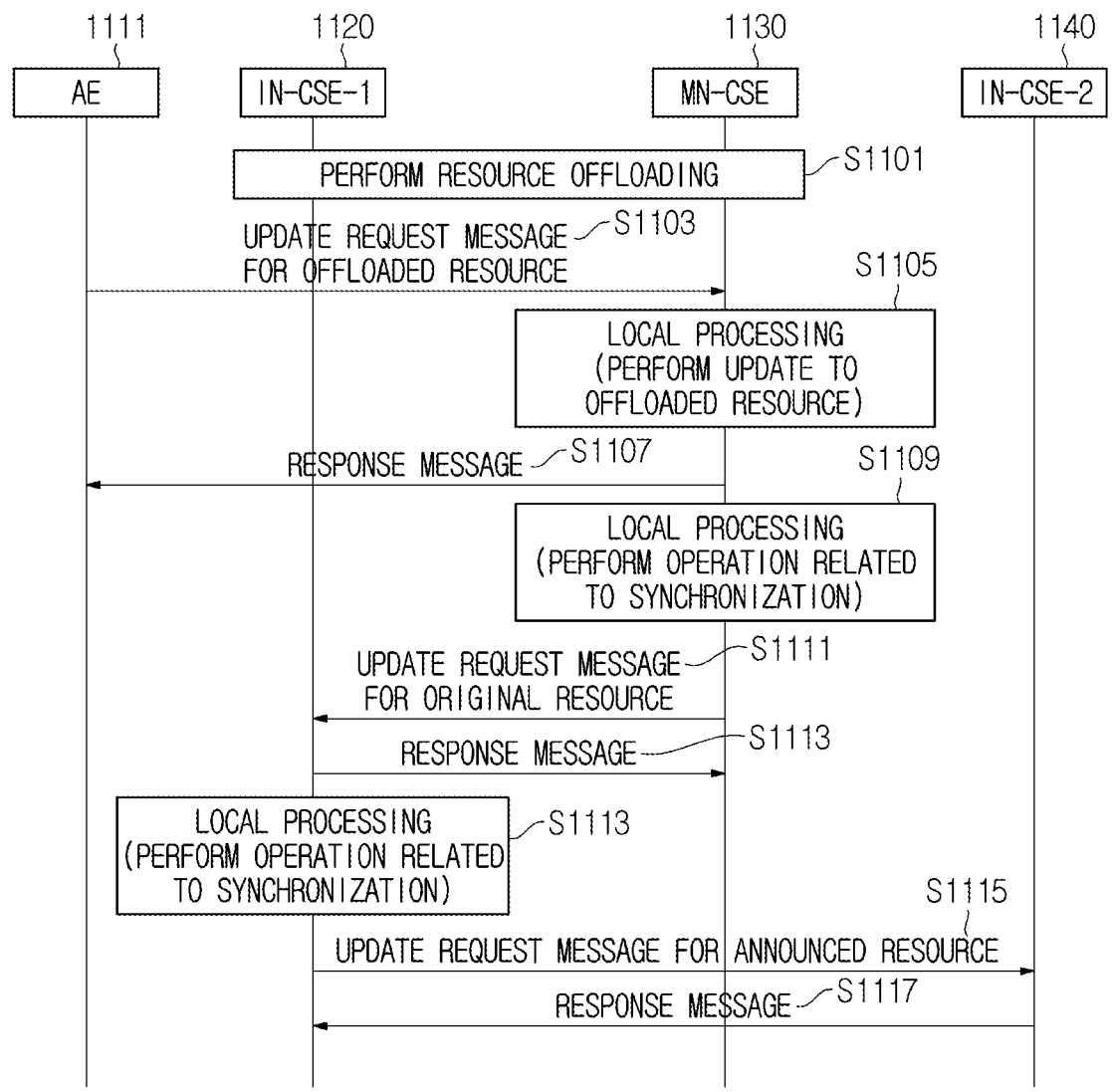
FIG. 11 shows another example of signal exchange for resource synchronization according to an update of an offloaded resource in an M2M system according to the present disclosure.
Figure 12:
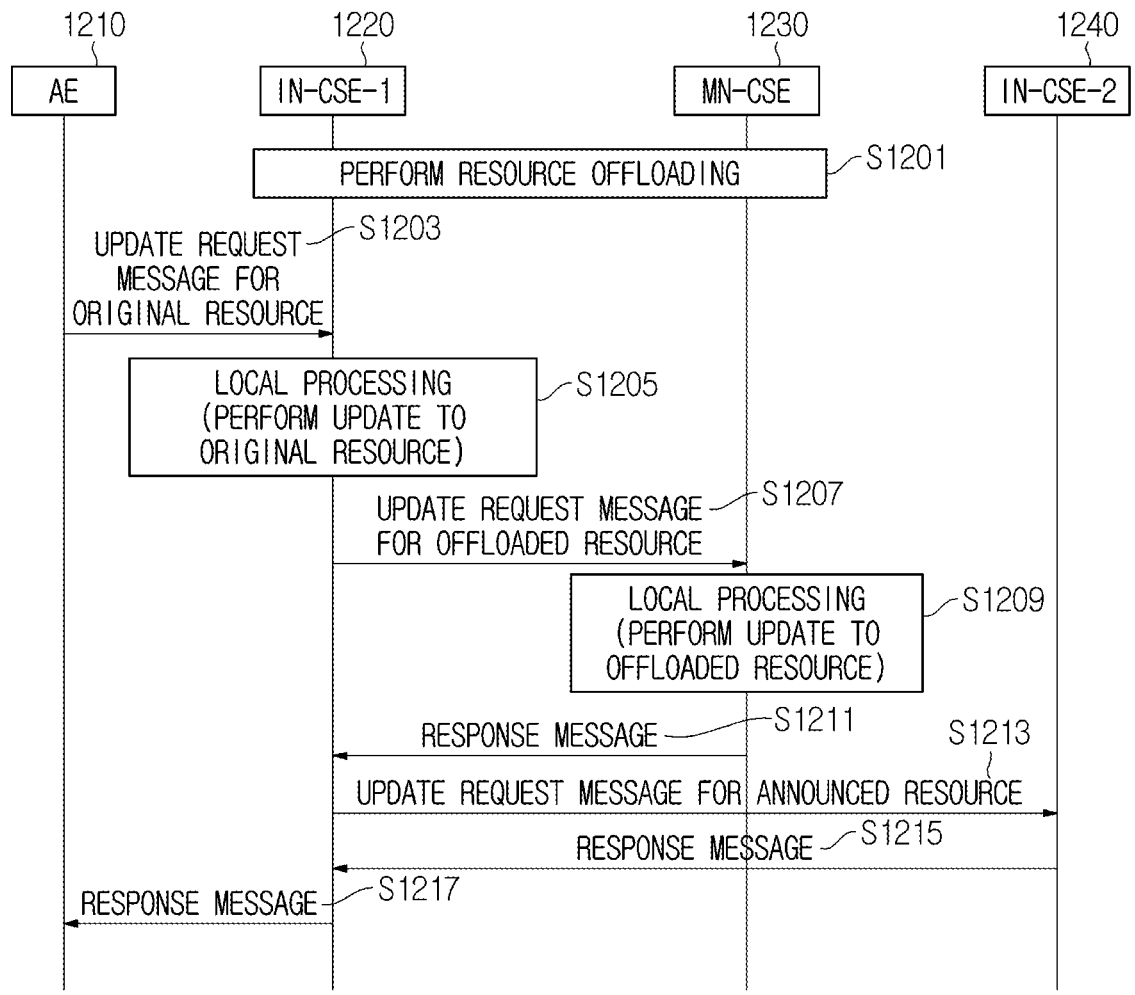
FIG. 12 shows another example of signal exchange for resource synchronization according to an update of an original resource in an M2M system according to the present disclosure.

FIG. 11 shows another example of signal exchange for resource synchronization according to an update of an offloaded resource in an M2M system according to the present disclosure. FIG. 11 shows signal exchange among an AE 1110, an IN-CSE-1 1120 hosting an original resource, an MN-CSE 1130 hosting an offloaded resource, and an IN-CSE-2 1140 hosting an announced resource.

Referring to FIG. 11, in step S1101, the IN-CSE-1 1120 performs an operation for offloading a resource to the MN-CSE 1130. Specifically, the IN-CSE-1 1120 offloads the original resource created in the IN-CSE-1 1120 to the MN-CSE 1130. In the example of FIG. 11, the resource is successfully offloaded. Accordingly, the MN-CSE 1130 becomes a remote CSE having a resource having the same data as the original resource.

In step S1103, the AE 1110 transmits an update request message for the offloaded resource to the MN-CSE 1130. In other words, the AE 1110 requests an update to at least one attribute of the offloaded resource stored in the MN-CSE 1130.

In step S1105, the MN-CSE 1130 performs local processing for updating the offloaded resource. In this case, the MN-CSE 1130 may check whether there is an authentication for an update, and update the offloaded resource if there is an authentication.

In step S1107, the MN-CSE 1130 transmits a response message to the AE 1110. That is, the MN-CSE 1130 responds to the AE 1110 that the update to the requested resource has been completed.

In step S1109, the MN-CSE 1130 performs local processing related to synchronization. As the update to the offloaded resource occurs, the CSE MN-CSE 1130 which is the remote CSE determines that synchronization on the updated information is performed. In this case, the MN-CSE 1130 may determine and perform synchronization based on the values of synchronization-related attributes stored in the resource.

In step S1111, the MN-CSE 1130 transmits an update request message for the original resource to the IN-CSE-1 1120. In other words, the MN-CSE 1130 requests an update to at least one attribute of the original resource stored in the IN-CSE-1 1120. Here, the at least one attribute includes at least one attribute updated according to the request of the AE 1110. According to an embodiment, the update request message may include information indicating that an update for synchronization is requested according to the update of the offloaded resource or information on the device (e.g., the AE 1110) that has requested the update of the offloaded resource.

In step S1113, IN-CSE-1 1120 transmits a response message to the MN-CSE 1130. That is, the IN-CSE-1 1120 updates the value of at least one attribute of the original resource, and responds to the AE 1110 that the requested update has been completed.

In step S1105, the MN-CSE 1130 performs local processing related to synchronization. As the update to the original resource occurs, the IN-CSE-1 1120 determines that synchronization on the updated information is performed. Specifically, the IN-CSE-1 1120 checks whether there is an announced resource with respect to the original resource, and determines that a procedure for synchronization with the announced resource is performed if there is an announced resource. In this case, the IN-CSE-1 1120 may determine and perform synchronization based on the values of synchronization-related attributes stored in the resource. In this embodiment, the update of the original resource causes synchronization on the announced resource.

In step S1117, the IN-CSE-1 1120 transmits an update request message for the announced resource to the IN-CSE-2 1140. In other words, the IN-CSE-1 1120 requests an update to at least one attribute of the announced resource stored in the IN-CSE-2 1140. Here, the at least one attribute includes at least one attribute updated according to the request of the MN-CSE 1130. According to an embodiment, the update request message includes at least one of information indicating that an update for synchronization is requested according to the update of the original resource, information on the device (e.g., AE 1110) that has requested the update of the offloaded resource, or information on the device (e.g., MN-CSE 1130) that has requested synchronization.

In step S1119, the IN-CSE-2 1140 transmits a response message to the IN-CSE-1 1120. That is, the IN-CSE-2 1140 updates the value of at least one attribute of the announced resource, and responds to the IN-CSE-1 1120 that the requested update has been completed.

FIG. 12 shows another example of signal exchange for resource synchronization according to an update of an original resource in an M2M system according to the present disclosure. FIG. 12 shows signal exchange for an AE 1210, an IN-CSE-1 1220 hosting an original resource, an MN-CSE 1230 hosting an offloaded resource, and an IN-CSE-2 1240 hosting an announced resource.

Referring to FIG. 12, in step S1201, the IN-CSE-1 1220 performs an operation for offloading a resource to the MN-CSE 1230. Specifically, the IN-CSE-1 1220 offloads the original resource created in the IN-CSE-1 1220 to the MN-CSE 1230. In the example of FIG. 12, the resource is successfully offloaded. Accordingly, the MN-CSE 1230 becomes a remote CSE having a resource having the same data as the original resource.

In step S1203, the AE 1210 transmits an update request message for the original resource to the IN-CSE-1 1220. In other words, the AE 1210 requests an update to at least one attribute of the original resource stored in the IN-CSE-1 1220.

In step S1205, the IN-CSE-1 1220 performs local processing for updating the original resource. At this time, the IN-CSE-1 1220 checks whether there is an authentication for an update. If there is an authentication, the IN-CSE-1 1220 updates the original resource. Furthermore, the IN-CSE-1 1220 determines whether there is an offloaded resource, and determines that an update procedure for the offloaded resource is performed.

In step S1207, the IN-CSE-1 1220 transmits an update request message for the offloaded resource to the MN-CSE 1230. The update request message may include at least one of information indicating that an update for synchronization is requested according to the update of the original resource, or information on a device (e.g., the AE 1010) that has requested the update of the original resource.

In step S1209, the MN-CSE 1230 performs local processing for updating the offloaded resource. That is, the MN-CSE 1230 updates the value of at least one attribute of the offloaded resource based on the update request.

In step S1211, the MN-CSE 1230 transmits a response message to the IN-CSE-1 1220. That is, the MN-CSE 1230 updates the value of at least one attribute of the offloaded resource, and responds to the IN-CSE-1 1220 that the requested update has been completed.

In step S1213, the IN-CSE-1 1220 transmits an update request message for the announced resource to the IN-CSE-2 1240. In other words, the IN-CSE-1 1220 requests an update to at least one attribute of the announced resource stored in the IN-CSE-2 1240. Here, the at least one attribute includes at least one attribute updated according to the request of the MN-CSE 1230. According to an embodiment, the update request message includes at least one of information indicating that an update for synchronization is requested according to the update of the original resource, information on a device (e.g., AE 1210) that has requested the update of the offloaded resource, and information on the device (e.g., the MN-CSE 1230) that has requested synchronization.

In step S1215, the IN-CSE-2 1240 transmits a response message to the IN-CSE-1 1220. That is, the IN-CSE-2 1240 updates the value of at least one attribute of the announced resource, and responds to the IN-CSE-1 1220 that the requested update has been completed.

In step S1217, the IN-CSE-1 1220 transmits a response message to the AE 1210. That is, the IN-CSE-1 1220 responds to the AE 1210 that the update to the requested resource has been completed.

Figure 13:
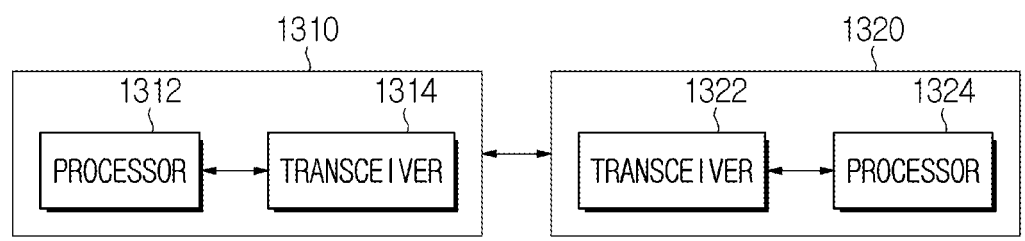
FIG. 13 shows a configuration of an M2M device in an M2M system according to the present disclosure.

FIG. 13 illustrates a configuration of an M2M device in an M2M system according to the present disclosure. An M2M device 1310 or an M2M device 1320 illustrated in FIG. 13 may be understood as hardware functioning as at least one among the above-described AE, CSE and NSE.

Referring to FIG. 13, the M2M device 1310 may include a processor 1312 controlling a device and a transceiver 1314 transmitting and receiving a signal. Herein, the processor 1312 may control the transceiver 1314. In addition, the M2M device 1310 may communicate with another M2M device 1320. The another M2M device 1320 may also include a processor 1322 and a transceiver 1324, and the processor 1322 and the transceiver 1324 may perform the same function as the processor 1312 and the transceiver 1314.

As an example, the originator, the receiver, AE and CSE, which are described above, may be one of the M2M devices 1310 and 1320 of FIG. 13, respectively. In addition, the devices 1310 and 1320 of FIG. 13 may be other devices. As an example, the devices 1310 and 1320 of FIG. 13 may be communication devices, vehicles, or base stations. That is, the devices 1310 and 1320 of FIG. 13 refer to devices capable of performing communication and are not limited to the above-described embodiment.

The above-described exemplary embodiments of the present disclosure may be implemented by various means. For example, the exemplary embodiments of the present disclosure may be implemented by hardware, firmware, software, or a combination thereof.

The foregoing description of the exemplary embodiments of the present disclosure has been presented for those skilled in the art to implement and perform the disclosure. While the foregoing description has been presented with reference to the preferred embodiments of the present disclosure, it will be apparent to those skilled in the art that various modifications and variations can be made in the present disclosure without departing from the spirit or scope of the present disclosure as defined by the following claims.

Accordingly, the present disclosure is not intended to be limited to the exemplary embodiments shown herein but is to be accorded the widest scope consistent with the principles and novel features disclosed herein. In addition, while the exemplary embodiments of the present specification have been particularly shown and described, it is to be understood that the present specification is not limited to the above-described exemplary embodiments, but, on the contrary, it will be understood by those skilled in the art that various changes and modifications may be made without departing from the spirit and scope of the present specification as defined by the claims below, and such changes and modifications should not be individually understood from the technical thought and outlook of the present specification.

In this specification, both the disclosure and the method disclosure are explained, and the description of both inventions may be supplemented as necessary. In addition, the present disclosure has been described with reference to exemplary embodiments thereof. It will be understood by those skilled in the art that various changes in form and details may be made therein without departing from the essential characteristics of the present disclosure. Therefore, the disclosed exemplary embodiments should be considered in an illustrative sense rather than in a restrictive sense. The scope of the present disclosure is defined by the appended claims rather than by the foregoing description, and all differences within the scope of equivalents thereof should be construed as being included in the present disclosure.

The invention claimed is:

1. A method of operating a machine-to-machine (M2M) device in an M2M system, the method comprising:
   creating a first resource;
   receiving a first message for requesting an update to the first resource; and
   transmitting a second message for requesting an update to a second resource to an other device hosting the second resource synchronized with the first resource,
   wherein the first resource comprises at least one attribute for offloading for a resource, and
   wherein the synchronization is performed based on one of a first type where updating is propagated uni-directionally between a offloaded resource and to an original resource or a second type where updating is propagated bi-directionally one-way between a offloaded resource and to an original resource or a second type.

2. The method of claim 1, wherein the at least one attribute comprises at least one of a first attribute for an offloaded location or a second attribute for a type related to announcement.

3. The method of claim 2, wherein the first attribute comprises an address of an offloaded resource corresponding to the first resource.

4. The method of claim 2, wherein the second attribute indicates a type related to announcement of the first resource.

5. The method of claim 2, wherein the second attribute indicates whether the first resource is a resource announced for offloading.

6. The method of claim 1, further comprising:
   updating the first resource in response to the first message.

7. The method of claim 1, wherein the second resource has higher priority for an update than the first resource.

8. The method of claim 7, wherein the second message is transmitted before the update to the first resource, and wherein the first resource is updated after the second resource is updated.

9. The method of claim 8, further comprising:
   receiving a third message which is a response to the second message from the other device; and
   updating the first resource.

10. A machine-to-machine (M2M) device in an M2M system, the M2M device comprising:
    a transceiver configured to transmit and receive a signal; and
    a processor configured to control the transceiver,
    wherein the processor is configured to:
    create a first resource;
    receive a first message for requesting an update to the first resource;
    transmit a second message for requesting an update to a second resource to another device hosting the second resource synchronized with the first resource,
    wherein the first resource comprises at least one attribute for offloading for a resource, and
    wherein the synchronization is performed based on one of a first type where updating is propagated uni-directionally between a offloaded resource and to an original resource or a second type where updating is propagated bi-directionally one-way between a offloaded resource and to an original resource or a second type.

11. The M2M device of claim 10, wherein the at least one attribute comprises at least one of a first attribute for an offloaded location or a second attribute for a type related to announcement.

12. The M2M device of claim 11, wherein the first attribute comprises an address of an offloaded resource corresponding to the first resource.

13. The M2M device of claim 11, wherein the second attribute indicates a type related to announcement of the first resource.

14. The M2M device of claim 11, wherein the second attribute indicates whether the first resource is a resource announced for offloading.

15. The M2M device of claim 10,
    wherein the processor is configured to create the second resource having a higher priority, for an updated than the first resource; transmit the second message before the update to the first resource and update the first resource after the second resource is updated.

* * * * *